Nov. 29, 1960     H. H. HOMER ET AL     2,962,616
FLUORESCENT LAMP
Filed May 1, 1959
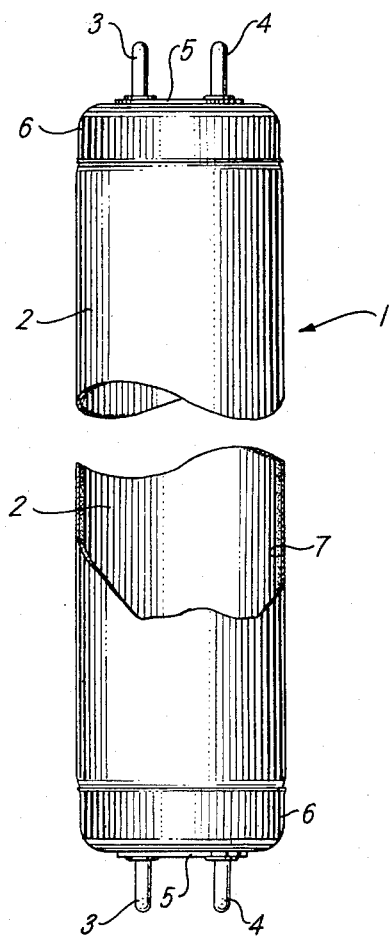
INVENTORS
KEITH H. BUTLER
HORACE H. HOMER
BY MARTHA J.B. THOMAS
ATTORNEY

United States Patent Office 2,962,616
Patented Nov. 29, 1960

2,962,616

FLUORESCENT LAMP

Horace H. Homer, Arlington, Martha J. B. Thomas, Woburn, and Keith H. Butler, Marblehead, Mass., assignors to Sylvania Electric Products Inc., a corporation of Delaware Filed May 1, 1959, Ser. No. 810,448

1 Claim. (Cl. 313—109)

This invention relates to fluorescent lamps and phosphors therefor, and to the manufacture of such lamps and phosphors.

Such lamps uitlize a coating of phosphor particles on a surface, the latter being generally the inside surface of an enclosing envelope of the lamp.

The phosphor particles in the coating generally have a size distribution which is rather broad, and includes a substantial portion of particles below 3 microns in size.

We have discovered that particles below 3 microns in size have a deleterious effect on the efficiency and brightness of the phosphor coating, because they produce scattering of the exciting ultraviolet light. We have further discovered that a lamp coating free from such fine particles has much greater brightness and efficiency.

On the other hand, the presence of particles of greater than about 30 microns in size produces a less smooth-appearing coating and one with poorer adherence to the supporting surface. These over-large particles must be removed, and prior to our invention they were removed by being broken up into smaller particles by milling, for example, by ball-milling in a liquid vehicle.

The milling breaks up the over-large particles into smaller ones, but it also breaks up some of the proper-size particles into smaller ones also, thereby increasing the number of super-fine or too-small particles, that is those of less than 3 microns in size.

We have discovered that the foregoing can be prevented by first eliminating all particles above 30 microns in size, and then eliminating those below 3 microns in size, and then placing the phosphor into suspension in the usual suspending liquid, for example an ethyl cellulose solution, by stirring it into the liquid, instead of ball-milling it to get it into suspension.

The method is particularly useful with a phosphor produced as in co-pending application, Serial No. 779,370, filed December 16, 1958, by K. H. Butler and H. H. Homer, two of the inventors in the present case. A phosphor produced in that manner has a better distribution of particle sizes than most others, and reduces the number of particles above 30 microns to be removed on the first separation. However, the method is not limited to that phosphor or to a phosphor produced by that method.

The removal of particles above 30 microns, and the subsequent removal of those below 3 microns, can be accomplished by the use of a so-called Alpine classifier, a device shown for other purposes than use with phosphors, in United States Patent 2,694,492, issued on November 16, 1954 to H. Rumpf et al.

If the latter classifier were used to eliminate the particles below 3 microns in size, and the phosphor then ballmilled extensively to break up the over-large particles and eliminate particles of more than 30 micron size, then additional superfine particles would also be produced, thereby counteracting the effect of the classifier.

However, with our system, the ball-milling to reduce particle size can be eliminated, and the phosphor merely stirred into the final coating suspension, to prevent the formation of more superfine particles.

By our invention, a coating of particle size confined to the region between 3 and 30 microns is produced, and we have discovered that a coating of that particle size, free from superfine particles below 3 microns or over-large particles above 30 microns greatly increases the efficiency and light output of the resultant lamp.

Other objects, features and advantages of the invention will be apparent from the following specification taken in connection with the accompanying drawing, in which the figure shows a lamp with a phosphor coating according to the invention.

In the figure the fluorescent lamp 1 can be, for example, of the type usual in the art, having the sealed glass tube 2, filled with argon at a pressure of about 2 millimeters of mercury, and containing the usual small quantity of mercury, and having the usual electrode at each end, connected to the contact pins 3, 4 set in an insulating piece 5 in base 6.

The phosphor coating 7, on the inner surface of tube 2, is composed of particles between 3 and 30 microns in size.

In producing such a coating, we can start, for example, with the calcium halophosphate phosphor of the process shown in the Butler and Homer application above-identified. We place the phosphor in the classifier of the Rumpf patent previously mentioned, and set the device to separate particles of below 30 micron size from those above that value. We then take the particles below 30 microns in size and put them in the classifier, setting it to remove particles below 3 microns in size.

The particles separated out between approximately 3 and 30 microns in size, are then stirred into a suspension of ethyl cellulose or other coating solutions well-known in the art, in the proportions customary in the art, to form a suitable coating suspension, which is there applied to the tube in the usual manner, and the cellulose baked out as is customary.

The resultant lamp will then have a coating of particles between 3 and 30 microns in size, and will be of high efficiency and brightness.

In one example of the invention, a so-called white 3500° white calcium halophosphate phosphor, activated with antimony and manganese, and made according to the method of the Butler and Homer application above-identified, a gain of almost 8% in efficiency was achieved by confining the particle size to between 3 and 30 microns. The first phosphor, made as stated above without separation as to particle size, and milled for about 4 hours, gave an efficiency of 68.8 lumens per watt (L.P.W.). A second phosphor, made in the same manner, but in which particles larger than 30 microns and smaller than 3 microns were removed, and milled only long enough to give dispersion, gave an efficiency of 74.1 L.P.W.

The value of the range recited is not limited to any particular phosphor, and is based on particle size, a physical property. Various phosphors can be used, for example, calcium halophosphate activated by antimony and manganese self-activated calcium tungstate, zinc silicate activated by manganese strontium pyrophosphate, barium titanium phosphate, and others.

What we claim is:

A fluorescent lamp including an envelope having on its inner surface a coating of phosphor particles substantially confined in size to between 3 and 30 microns particle size.

References Cited in the file of this patent

UNITED STATES PATENTS

| 2,103,032 | Fritz et al. | Dec. 21, 1937 |
| 2,177,691 | Dawihl et al. | Oct. 31, 1939 |
| 2,181,305 | Meyrs | Nov. 28, 1939 |

Notice of Adverse Decision in Interference

In Interference No. 92,395 involving Patent No. 2,962,616, H. H. Homer, M. J. B. Thomas and K. H. Butler, FLUORESCENT LAMP, final judgment adverse to the patentees was rendered May 11, 1965, as to claim 1.

[*Official Gazette September 28, 1965.*]